US006277232B1

(12) United States Patent
Wang et al.

(10) Patent No.: US 6,277,232 B1
(45) Date of Patent: Aug. 21, 2001

(54) METHOD OF MANUFACTURING A PLASTIC CARD WITH A LENTICULAR LENS THEREIN

(75) Inventors: Jachin Wang, Des Plaines; Dale Mitchell Pfingst, Aurora, both of IL (US); Susan Green, Wilmington, DE (US); George McGonigle, Thorofare, NJ (US)

(73) Assignee: MBNA America Bank, N.A., Wilmington, DE (US)

( * ) Notice: Subject to any disclaimer, the term of this patent is extended or adjusted under 35 U.S.C. 154(b) by 0 days.

(21) Appl. No.: 09/295,600

(22) Filed: Apr. 22, 1999

(51) Int. Cl.[7] .......... B32B 31/00

(52) U.S. Cl. .......... 156/250; 156/277; 156/327; 156/308.2; 156/583.1; 283/70; 283/75; 283/82; 283/94; 283/109

(58) Field of Search .......... 156/250, 277, 156/327, 308.2, 583.1; 283/70, 75, 82, 94, 109

(56) References Cited

U.S. PATENT DOCUMENTS

| | | | | |
|---|---|---|---|---|
| 3,716,439 | * | 2/1973 | Maeda | 156/269 |
| 3,836,754 | * | 9/1974 | Toye et al. | 235/488 |
| 4,497,872 | * | 2/1985 | Hoppe et al. | 428/483 |
| 4,758,296 | * | 7/1988 | McGrew | 156/231 |
| 5,438,928 | * | 8/1995 | Chatwin et al. | 101/369 |
| 5,605,738 | * | 2/1997 | McGinness et al. | 428/195 |
| 6,016,225 | * | 1/2000 | Andersoon | 359/619 |

* cited by examiner

*Primary Examiner*—Linda Gray
(74) *Attorney, Agent, or Firm*—Hunton & Williams

(57) ABSTRACT

A method of manufacturing a plastic card comprises the steps of providing a sheet of lenticular lens material; coating the back side of the lens material with a vinyl resin base; printing the back side of the lens material with a composite lithographic image; coating the back side of the lens material with an adhesive such that it can adhere to a sheet of plastic which serves as the back of the plastic card; and laminating the sheets together.

21 Claims, 2 Drawing Sheets

METHOD OF MANUFACTURING A PLASTIC CARD WITH A LENTICULAR LENS THEREIN

BACKGROUND OF THE INVENTION

The present invention relates to a process for manufacturing a plastic card, such as a credit, charge or debit card, having a lenticular lens therein to view multi-dimensional, lithographic images. Using this process, a plastic card can have artistic, visual images creating the illusions of depth and moving effects imprinted therein. Moreover, this process results in a plastic card which meets financial industry standards for security, reliability and durability.

By way of background, there are many different types and styles of credit, charge, debit and other financial cards made out of plastic. Typically, a plastic card, such as a credit card, has one or two central layers of white or colored plastic. A clear plastic film is then laminated to the front and rear surfaces of this central plastic layer.

Additionally, there are known processes of producing multi-dimensional, lithographic images which impart the illusions of depth and/or motion to a viewer. Typically, lithographic images are created by using a series of individual still pictures created from photographs or other artistic works which are segmented and then merged together in a desired sequence to form a composite picture or image. There are also known methods of segmenting and merging the individual pictures using a computer to convert the original artwork into electronic data, and to order and interface frames into sequence to form a composite image. It is further known that the composite image can be outputted to an imaging device which prints the image onto film and that the resulting film can be used to produce multiple prints of the composite image by transfer to a suitable substrate, such as paper stock. There are also various known processes of adhering to the paper stock lenticular lens material consisting of an array of identical spherically curved surfaces embossed on the front surface of a plastic sheet. The lenticular lens material refracts light from each image in sequence as the viewer's angle of perception changes. The result is the perception of motion from a series of still images.

However, it has not been previously known how to manufacture a traditional plastic card, such as used for a credit card, which has a multidimensional, lithographic image viewed through lenticular lens material imprinted therein. The various materials could not be successfully adhered and/or laminated in a manner so that the resulting plastic card was durable enough to withstand typical wear and use for a prolonged period of time.

SUMMARY OF THE INVENTION

It is therefore an object of the present invention to provide a durable, long-lasting plastic card having a lenticular lens therein through which to view lithographic images, thereby imparting the illusions of depth and/or motion to the lithographic images.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the method of manufacturing a plastic card of this invention comprises the steps of (a) providing a sheet of lenticular lens material having a front side and a back side, the front side having an array of identical spherically curved surfaces embossed thereon, the back side being flat; (b) coating the back side of the sheet of lenticular lens material with a vinyl resin base; (c) printing the back side of the sheet of lenticular lens material with a composite lithographic image; (d) coating the back side of the sheet of lenticular lens material with an adhesive; (e) providing a sheet of plastic having a front surface and a rear surface; (f) printing the rear surface of the sheet of plastic; (g) providing a sheet of clear PVC overlay film; (h) laminating magnetic material onto the sheet of clear PVC overlay film; (i) assembling and collating the sheet of lenticular lens material, the sheet of plastic and the sheet of clear PVC overlay film with laminated magnetic material so that the sheet of lenticular lens material is oriented on the top of the three sheets and the sheet of plastic is oriented in the middle of the three sheets; 0) laminating the assembled sheets, collated sheets of lenticular lens material, plastic and the clear PVC overlay film with laminated magnetic material; (k) applying a coating to the laminated, assembled sheets in a designated area where a hologram is to be stamped; (l) cutting a plurality of cards from the laminated, assembled sheets, each of said plurality of cards having a front side and a back side; (m) stamping the hologram onto the designated area on the front side of each of the plurality of cards; and (n) stamping signature panels onto the back side of each of the plurality of cards.

The accompanying drawings, which are incorporated and constitute a part of this specification, illustrate one embodiment of the invention and, together with the description, serve to explain the principles of the invention.

DETAILED DESCRIPTION OF THE PREFERRED EMBODIMENT

Figure 1:
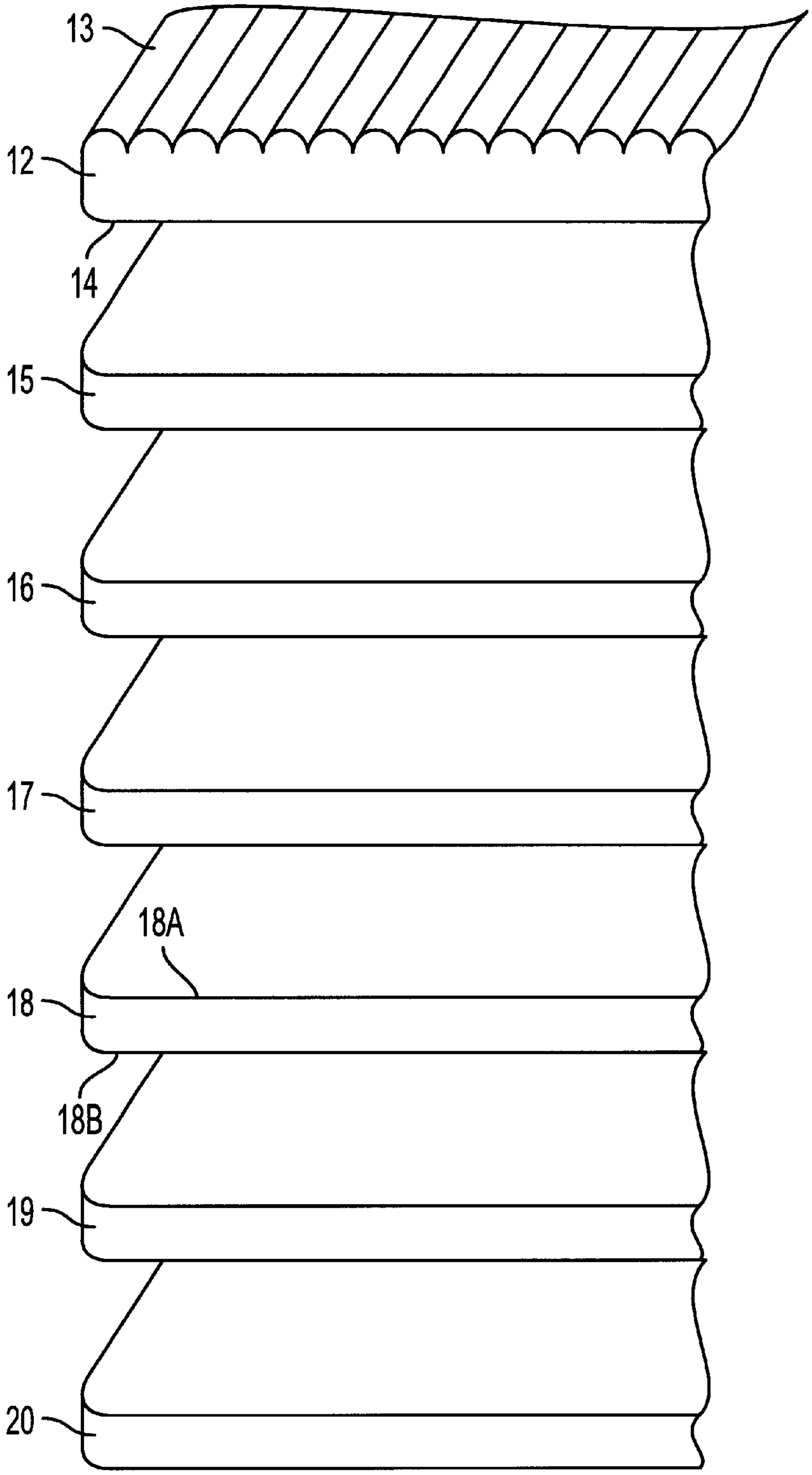
FIG. 1 is a cross-sectional view of the plastic card with lenticular lens of the present invention, showing the layers of materials used in manufacturing the card.

Reference will now be made in detail to the present preferred embodiment of the invention, an example of which is illustrated in the accompanying drawings in which like reference characters refer to corresponding elements.

As shown in FIG. 1, a cross-section of the plastic card with a lenticular lens of the present invention is illustrated. Card 10 of the present invention includes an upper layer of lenticular lens material 12 preferably formed of clear PVC plastic, but other plastic material, such as PET plastic, may be used. The clear plastic material has an array of identical spherically curved surfaces embossed on a front side 13 and is flat on a back side 14. The array of identical spherically curved surfaces are formed by using an engraved cylindrical roller that has been radially-grooved, such that when a sheet of flat clear plastic lens material is fed through the roller, it produces the array of identical spherically curved surfaces on the front side of the clear plastic lens material. This array of identical spherically curved surfaces are the "lenses". There are 100 lenses per lineal inch in the clear plastic material. The lenticular lens material layer 12 is approximately 0.014" thick.

On the back side 14 of the lenticular lens material 12, there is a vinyl resin coating 15, an ink layer 16, an adhesive layer 17, a layer of core stock 18 comprised of white PVC plastic approximately 0.0135" thick for use for a back side of the plastic card 10, another layer of ink 19 and a layer of clear PVC overlay film (or "laminating" film) 20 approximately 0.002" thick.

Figure 2:
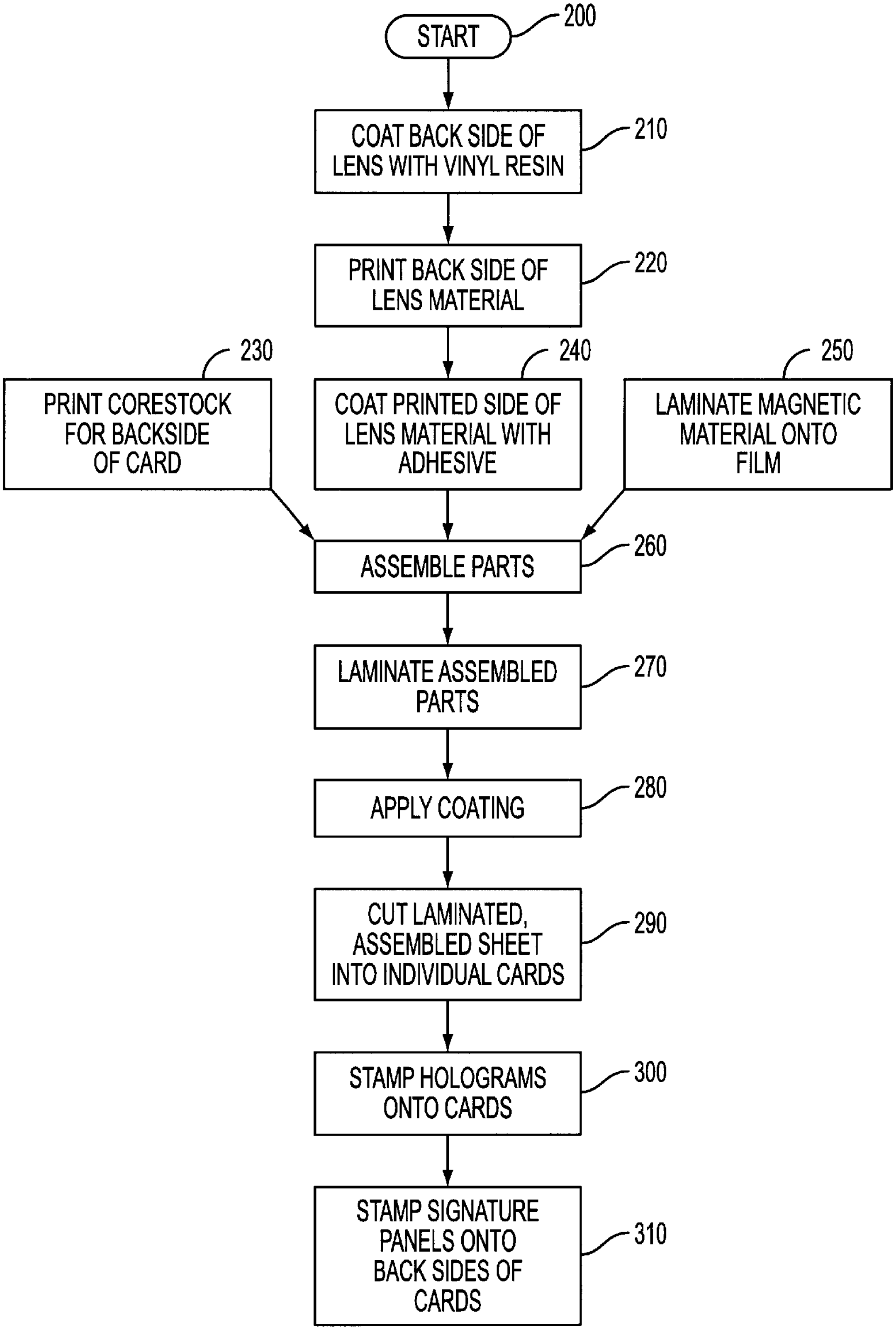
FIG. 2 is a flow diagram depicting the steps performed in the method of manufacturing the card of FIG. 1.

As shown in FIG. 2, the process of manufacturing the plastic card 10 includes starting with a sheet of clear PVC plastic lenticular lens material approximately 0.014" in thickness and approximately 22¾" wide by 27¾" long with the array of identical spherically curved surfaces or lenses on the front side 13. (It should be noted that sheets of any other width and length may also be used.) The process then proceeds with step 210 wherein a vinyl resin coating 15 is applied to the back side 14 of the lenticular lens material 12 using a Sakarai Cylinder Press. The application of coating 15 is performed through a process similar to silk screening. It should be noted that other machines comparable to the Sakarai Cylinder Press may also be used for this step.

Step 220 comprises printing the back side 14 of the lens material 12 with a reverse image of a composite lithographic image previously saved on film. The printing is preferably done in stochastic printing format performed on offset lithography using a Heidelberg Four-Color Press or other comparable machine, but it could be performed by any other applicable printing process such as letterpress or rotogravure printing. The ink 16 which is used to print the image is comprised of ultraviolet (UV) curable ink specially formulated for use on plastic. In step 220, it is critical that there is the proper registration or alignment of the image to be printed on the back side 14 with the array of spherically curved lenses on the front side 13 of the lenticular lens material 12 in order to achieve the desired visual presentation of depth and/or motion of the image.

After the printing step 220 has occurred, steps 230, 240 and 250 can be done concurrently. Step 230 comprises taking a sheet of white PVC plastic core stock material 18 approximately 0.0135" in thickness and 22¾" wide by 27¾" long and having surface a front 18A and a rear surface 18B. (Again, the width and length of sheet 18 may be varied.) This core stock material 18 is used for the back side of card 10. The rear surface 18B is printed with the text which is to appear on the back of card 10 preferably by an offset lithography process using a Heidelberg Two or Four-Color Press or other comparable machine. Again, this printing can also be done by other applicable printing processes. The ink 19 used for printing the text on rear surface 18B is comprised of UV curable ink specially formulated for use on plastic.

Step 240 comprises coating the back side 14 of the lenticular lens material 12 with a vinyl acetate co-polymer adhesive material 17. The application of adhesive material 17 is performed using a silk-screening process with a Sakarai Cylinder Press or other comparable machine. Step 250 comprises providing a sheet of clear PVC overlay film 20 approximately 0.002" in thickness to which magnetic, ferrous oxide material is thermally laminated using a Louda TL-700 Tapelayer or other comparable machine. The resultant material is similar to audio or video recording tape.

Following steps 230, 240 and 250, in step 260, the sheet of lenticular lens material 12 with adhesive 17, the sheet of core stock material 18 and the sheet of clear PVC overlay film 20 laminated with magnetic, ferrous oxide material are assembled and collated. This assembly step 260 includes ensuring the proper orientation of the sheets resulting from steps 230, 240 and 250. The sheet of lenticular lens material 12 is to be oriented on the top of the three sheets and the sheet of core stock material 18 is to be oriented in the middle of the three sheets. The sheets 12 and 18 are manually placed onto a machine feed table. The machine feed table includes pneumatically-activated clamps to grip the sides of the sheets and convey them into a Louda GM-400 collator machine or other comparable machine. The edges of the sheets of printed lenticular lens material 12 and printed core stock material 18 are mechanically aligned with the edges of the sheet of clear PVC overlay film 20 which is fed continuously through the machine. Once sheets 12 and 18 are mechanically aligned with the sheet of clear PVC overlay film 20, there are four clamps which clamp together the four comers of the three sheets and with the application of heat, each clamp will tack weld the three sheets together with areas of weld of approximately 0.06 square inches each. The three sheets, being held together by the tack welds of the four comers, are transported through and out of the machine.

These assembled sheets are all laminated together in step 270 using a vertical, steam heated, multi-plated laminator to press the components together. The lamination is performed at a temperature of approximately 290° F. and applying a pressure of approximately 200 pounds per square inch (PSI) for approximately 25–30 minutes. The combination of the elevated temperature and pressure applied in the lamination step 270 causes the materials in the layers of the sheets to soften and the adhesives between the layers to activate. At the end of the 25–30 minute heat cycle, cold water is introduced to the platens of the press while the pressure is maintained causing the laminated, assembled sheets to solidify and cool to room temperature.

Following step 270, in step 280, a special clear coating is applied to a designated area where a hologram is to be stamped on the front surface 13 of lenticular lens material 12 by a silk screen process using a Sakarai Cylinder Press or other comparable machine or, alternatively, by using a hot stamping process or other comparable process. The special clear coating consists of a vinyl resin and serves to flatten the designated area so that a hologram can later be applied thereto.

In step 290, the coated laminated, assembled sheet resulting from step 280 is die cut into a plurality of individual cards 10 using a Louda DC 506 die cut machine or other comparable machine. This machine uses a multi-cavity, progressive shearing action, punch and die set. Each laminated, assembled sheet once die cut should produce about 72 individual cards 10.

After the completion of step 290, step 300 is performed wherein a hologram is stamped onto the designated area on the front of each card 10 utilizing a Franklin-Louda 190 hot stamp machine or other comparable machine. These hot stamp machines utilize a heated die at a temperature of 340° F. and pressure to thermally affix foil material for a hologram onto the plastic card 10. The hologram serves as a security feature protecting against counterfeit cards. Next, step 310 is performed wherein a signature panel is hot-stamped onto the rear of card 10. The card 10 is considered complete at this point and is ready for shipment to a card processor for encoding with unique user information and embossing.

When the card 10 is completely fabricated, a user of the card 10 viewing the composite lithographic image imprinted in the card through the top surface of the lenticular lens material 12 and, depending upon the image imprinted, can perceive the illusion that the image is moving if the card 10 is rotated slightly and/or can perceive that the image has the appearance of being three-dimensional.

The plastic card with lenticular lens of this invention when manufactured using the method described herein will conform to the standards of the International Organization of Standardization (ISO)/International Electrotechnical Commission (IEC) applicable to plastic financial cards. Moreover, use of the method for manufacturing the plastic card of the present invention will result in a card having a high level of durability, security and reliability while allowing the user to view pleasing lithographic images contained therein.

And, it will be apparent to those skilled in the art that various modifications and variations can be made to the method of the present invention without departing from the scope or spirit of the invention. Thus, it is intended that the present invention cover the modifications and variations of this invention provided they come within the scope of the appended claims and their equivalents.

What is claimed is:

1. A method of manufacturing a plastic card comprising the steps of:

a. providing a sheet of lenticular lens material having a front side and a back side, the front side having an array of identical spherically curved surfaces embossed thereon, the back side being flat;

b. coating the back side of the sheet of lenticular lens material with a vinyl resin base;

c. printing over the vinyl resin base on the back side of the sheet of lenticular lens material with a filmed image;

d. coating the back side of the sheet of lenticular lens material with an adhesive after the printing;

e. providing a sheet of plastic having a front surface and a rear surface;

f. printing the rear surface of the sheet of plastic;

g. providing a sheet of clear PVC overlay film;

h. laminating magnetic material onto the sheet of clear PVC overlay film;

i. assembling and collating the sheet of lenticular lens material, the sheet of plastic and the sheet of clear PVC overlay film with laminated magnetic material so that the sheet of plastic is oriented in the middle of the three sheets; and j. laminating the assembled, collated sheets of lenticular lens material, plastic and clear PVC overlay film laminated with magnetic material using a platen press laminator.

2. The method of manufacturing a plastic card as claimed in claim 1 wherein the sheet of lenticular lens material is comprised of PVC plastic approximately 0.014" thick.

3. The method of manufacturing a plastic card as claimed in claim 1 wherein the step of printing the back side of the sheet of lenticular lens material is done in stochastic printing format performed on offset lithography.

4. The method of manufacturing a plastic card as claimed in claim 1 wherein the step of printing the rear surface of the sheet of plastic is done using an offset lithography process.

5. The method of manufacturing a plastic card as claimed in claim 1 wherein the sheet of plastic is comprised of white PVC core stock material approximately 0.0135" thick.

6. The method of manufacturing a plastic card as claimed in claim 1 wherein the adhesive for the back side of the sheet of lenticular lens material is comprised of a vinyl acetate co-polymer.

7. The method of manufacturing a plastic card as claimed in claim 1 wherein the step of laminating the assembled, collated sheets of lenticular lens material, plastic and clear PVC overlay film with laminated magnetic material is performed at a temperature of approximately 290° F., applying a pressure of approximately 200 PSI to the sheets for approximately 25 to 30 minutes.

8. The method of manufacturing a plastic card as claimed in claim 1 wherein the step of coating the back side of the sheet of lenticular lens material is done using a silk-screening process.

9. The method of manufaturing a plastic card as claimed in claim 1 wherein The step of printing the back of lenticular lens material uses a UV curable ink.

10. The method of manufacturing a plastic card as claimed in claim 1 wherein the step of printing the rear surface of the sheet of plastic uses a UV curable ink.

11. The method of manufacturing a plastic card as claimed in claim 1 wherein the method further includes the step of applying a clear coating to the laminated, assembled sheets in a designated area where a hologram is to be stamped following the step of laminating the assembled, collated sheets of lenticular material, plastic and clear PVC overlay film laminated with magnetic material.

12. The method of manufacturing a plastic card as claimed in claim 11 wherein the step of applying a clear coating to the laminated, assembled sheets in a designated area where a hologram is to be stamped is done using a silk-screening process.

13. The method of manufacturing a plastic card as claimed in claim 11 wherein the clear coating applied to the laminated, assembled sheets in a designated area where a hologram is to be stamped is a vinyl resin.

14. The method of manufacturing a plastic card as claimed in claim 11 wherein the method further includes the step of cutting a plurality of cards from the laminated, assembled sheets, each of said plurality of cards having a front side and a back side.

15. The method of manufacturing a plastic card as claimed in claim 14 wherein the method further includes the step of stamping the hologram onto the designated area on the front side of each of the plurality of cards.

16. The method of manufacturing a plastic card as claimed in claim 15 wherein the method further includes the step of stamping signature panels onto the back side of each of the plurality of cards.

17. The method of manufacturing a plastic card as claimed in claim 14 wherein the method further includes the step of stamping signature panels onto the back side of each of the plurality of cards.

18. The method of manufacturing a plastic card as claimed in claim 1 wherein the method further includes the step of cutting a plurality of cards from the laminated, assembled sheets, each of said plurality of cards having a front side and a back side, following the step of laminating the assembled, collated sheets of lenticular material, plastic and clear PVC overlay film laminated with magnetic material.

19. The method of manufacturing a plastic card as claimed in claim 18 wherein the step of cutting a plurality of cards from the laminated, assembled sheets is done; using a die cut machine.

20. The method of manufacturing a plastic card as claimed in claim 18 wherein the method further includes the step of stamping signature panels onto the back side of each of the plurality of cards.

21. A method of manufacturing a plastic card comprising the steps of;

a. providing a sheer of lenticular lens material having a front side and a back side, the front side having an array if identical spherically curved surfaces embossed thereon, the back side being flat;

b. coating the back side of the sheet of lenticular lens material with a vinyl resin base;

c. printing the back side of the sheet of lenticular lens material over the vinyl resin base with a filmed image;

d. coating the back side of die sheet of lenticular lens material with an adhesive after the printing;

e. providing a sheet of plasic having a front surface and a rear surface;

f. printing the rear surface of the sheet of plastic;

g. providing a sheet of clear PVC overlay film;

h. laminating magnetic material onto the sheet of clear PVC overlay film;

i. assembling and collating the sheet of lenticular lens material, the sheer of plastic and the sheer of clear PVC overlay film with laminated magnetic material so that the sheet of plastic is oriented in the middle of the three sheets;

j. laminating the assembled, collated sheets of lenticular lens material, plastic and clear PVC overlay film laminated with magnetic material using a platen press laminator;

k. applying a clear coating to the laminated, assembled sheets in a designated area where a hologram is to be stamped; and l. stamping the hologan onto the designated area.

* * * * *